United States Patent [19]

Gough

[11] Patent Number: 4,857,745

[45] Date of Patent: Aug. 15, 1989

[54] METHOD AND APPARATUS FOR MONITORING THE PASSAGE OF MARKS ON A WEB

[75] Inventor: Martin Gough, Berkhamstead, England

[73] Assignee: Crosfield Electronics Limited, London, England

[21] Appl. No.: 187,195

[22] Filed: Apr. 28, 1988

[30] Foreign Application Priority Data

Apr. 28, 1987 [GB] United Kingdom ................. 8710021

[51] Int. Cl.[4] ...................... G01N 21/86; G06K 15/00

[52] U.S. Cl. .................................... 250/548; 250/557; 101/181

[58] Field of Search ............... 250/548, 557, 571, 560, 250/561, 223 R; 355/40, 41; 340/675; 226/27, 28; 101/181, 248

[56] References Cited

U.S. PATENT DOCUMENTS 4,142,105 2/1979 Erdmann ............................ 250/560

4,370,059 1/1983 Masuda .............................. 250/548

4,484,522 11/1984 Simeth ................................ 101/181

4,485,982 12/1984 St. John et al. ..................... 250/557

4,518,856 5/1985 Blackington ........................ 250/557

4,683,380 7/1987 Shipkowski et al. ............... 250/548

*Primary Examiner*—David C. Nelms

*Assistant Examiner*—Michael Messinger

*Attorney, Agent, or Firm*—Sughrue, Mion, Zinn, Macpeak and Seas

[57] ABSTRACT

A method and apparatus for monitoring the passage of a mark on a web. The web is caused to move through a detection station at which at least that portion of the web carrying the mark is illuminated. An image of the mark is projected onto a quadrant array of photodetector elements at the detection station. The axes defined between the elements are transverse to the direction of movement of the web. The times $t_1$, $t_2$ at which substantially equal areas of a mark are projected on either side of the axes are determined which provides an indication of registration of the web.

14 Claims, 3 Drawing Sheets

METHOD AND APPARATUS FOR MONITORING THE PASSAGE OF MARKS ON A WEB

FIELD OF THE INVENTION

The invention relates to a method and apparatus for monitoring the passage of marks on a web.

DESCRIPTION OF THE PRIOR ART

In the printing industry, it is common, particularly in the case of colour printing, to cause the web onto which a picture is to be printed to pass in series through a number of printing stations. At each printing station, one of the colour components of the picture is printed onto the web. It is important that each colour component is registered with each of the other colour components. Registration is achieved by closely controlling the position of the web at each printing station. In order to monitor or control registration, it is conventional to print onto the web in a track extending along the length of the web a number of register marks, at least one for each colour component. Typically, these marks have an accurate, predetermined shape and are then detected at a detection station. The time interval between successive marks corresponding to different colour components then provides an indication of whether the colour components are registered in the direction of web travel while the relative lateral positions between the marks indicates the degree of registration of the colour components in the lateral direction.

In the case of gravure printing, a detection station is provided after each printing station and the output of the detection apparatus at each detection station is used to control the position of the web as it passes through the printing station subsequently so as to provide real time correction. In offset web printing, it is more common to print all the colour components of a picture and then monitor the register marks downstream of all the printing stations. As a result of this monitoring stage, subsequent web movement is adjusted to compensate for any registration errors.

An example of a method of web register control is described in GB-A-1253426.

One of the problems with the known register control systems is the need for each register mark to have a closely defined shape. This is particularly important where the mark is to be used for providing lateral offset (or sidelay) information in which the lateral position is encoded into the shape of the registration mark.

SUMMARY OF THE INVENTION

In accordance with one aspect of the present invention, a method of monitoring the passage of a mark on a web comprises causing a web to move through a detection station and illuminating at least that portion of the web carrying the mark; causing an image of the mark to be projected onto a symmetrical array of detector elements at the detection station, at least two of the axes defined between the elements being transverse to the direction of movement of the web; and determining the times ($t_1$, $t_2$) at which substantially equal areas of a mark are projected on either side of the axes.

This invention deals with the problem described above by transferring the problem of mark shape from the mark to the detector.

An example of a suitable array is a quadrant array which is well known for use in monitoring the form of a radiation beam such as a laser beam and an example of such use is described in EP-A-0057339. However in all these uses the "image" of the beam and the array are stationary.

Typically, the array will have just four detector elements, each having substantially the same shape and size. However, variations in the form of the array are possible and for example other numbers of elements such as six or eight could be used.

Typically the elements of the array are arranged symmetrically about a first line transverse, preferably orthogonal, to the web direction, the method further comprising determining a time representative of when the mark crosses said line.

Preferably, the elements are also arranged symmetrically about a second line orthogonal to the first line.

Conveniently, the method further comprises determining a time ($t_3$), at which the mark crosses a line orthogonal to the direction of movement of the web, wherein $$t_3=(t_1+t_2)/2$$

The invention is particularly applicable to a method of monitoring the registration of a web carrying a number of register marks normally spaced apart in the direction of the web movement by a predetermined amount in which a method according to the first aspect of the invention is carried out on each mark and in which the elements of the array are symmetrically arranged about a line orthogonal to the direction of movement of the web, the method comprising determining a time representative of when each mark crosses said line. The difference between each determined time then indicates the degree of misregistration in the direction of web movement.

The method according to the first aspect of the invention is also applicable to a method of monitoring the registration of a web carrying at least one register mark, the method comprising determining the difference between the times $t_1$, $t_2$ to generate a lateral offset factor. This lateral offset factor provides an indication of the lateral position of the web (or sidelay) relative to some predetermined, normal position. In practice, the lateral offset factor is determined from the difference between the times $t_1$, $t_2$ and the velocity of the web which could be determined, for example, by monitoring the time between register marks for the same colour component passing through the detection station.

In accordance with a second aspect of the present invention, a method of web register control comprises printing on a web two or more register marks one behind the other in a track extending in the direction of travel of the web, the marks being separated from one another by a predetermined distance when register is correct, monitoring the passage of a mark through a detection station by carrying out a method in accordance with the first aspect of the invention, and controlling subsequent movement of the web in response to the determined times.

For example, the speed of the web could be controlled to maintain the time intervals between marks passing through the detection station substantially constant (which may be determined in the manner explained above); and/or adjusting the lateral position of the web in response to a lateral offset factor related to the difference between the two times $t_1$, $t_2$.

In accordance with a third aspect of the present invention, apparatus for monitoring the passage of a mark on a web comprises feed means for feeding the web through a detection station; a light source for illuminating that portion of the web carrying the mark at the detection station; a symmetrical array of detector elements onto which an image of the mark is projected at the detection station, at least two of the axes defined between the elements being transverse to the direction of movement of the web; and processing means for determining the times $t_1$, $t_2$ at which substantially equal areas of a mark are projected on either side of the axes.

As explained above, such monitoring apparatus could be incorporated into conventional printing apparatus such as gravure or offset printing apparatus to achieve register control.

Typically, the detector elements comprise photodetectors.

BRIEF DESCRIPTION OF THE DRAWINGS

An example of a web offset printing system incorporating web register control apparatus according to the invention will now be described with reference to the accompanying drawings, in which.

DETAILED DESCRIPTION OF AN EMBODIMENT

Figure 1:
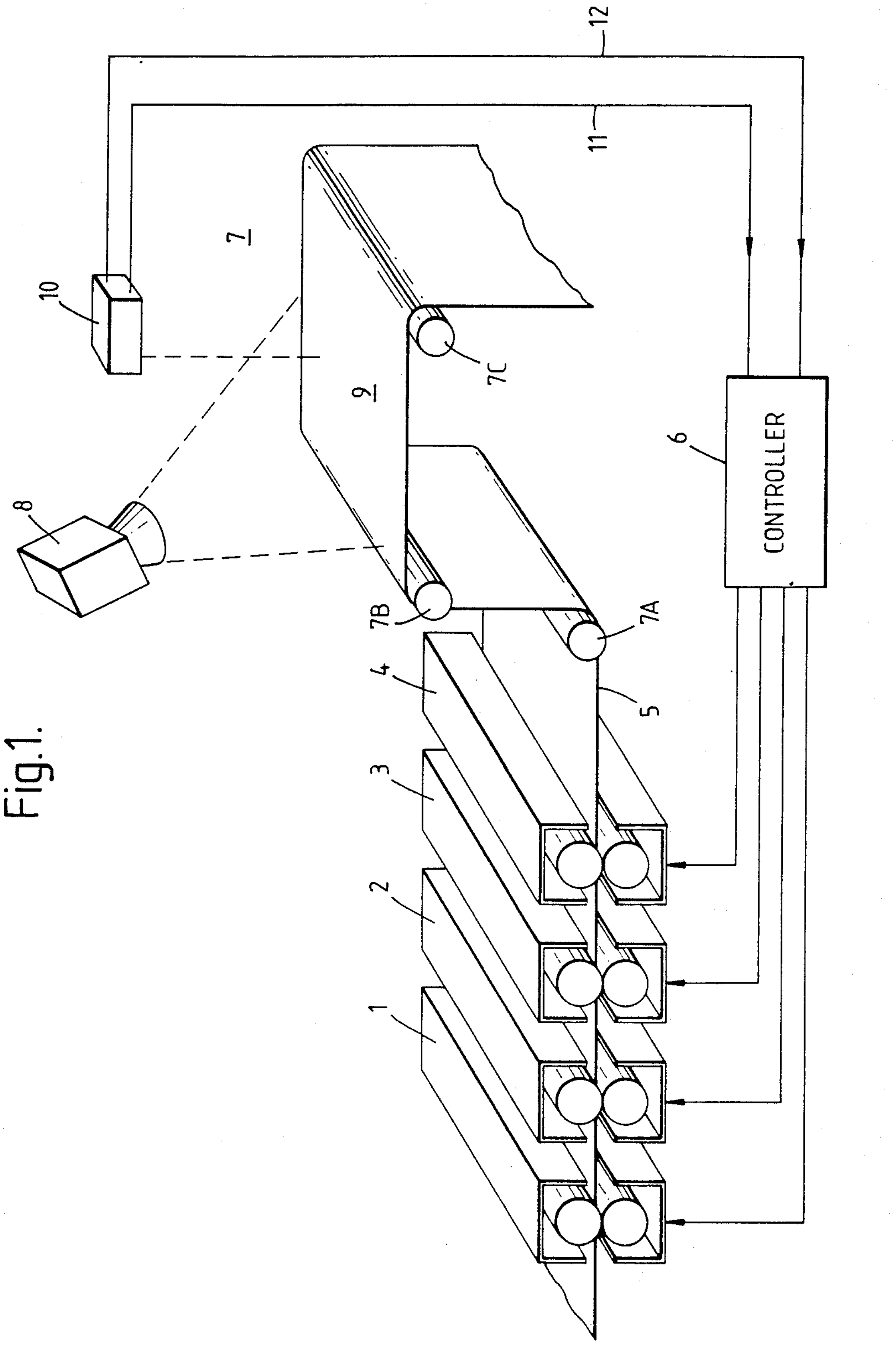
FIG. 1 is a schematic view of the printing apparatus.

The printing apparatus shown in FIG. 1 has a conventional form comprising in series four offset web printing units 1–4 which print onto a web 5 respective colour components of an image. Typically, these colour components will be cyan, magenta, yellow, and black. The position and speed of the web 5 as it passes through each of the printing units 1–4 is controlled by each of those printing units in response to signals from a controller 6 incorporating a microcomputer.

Downstream of the printing units 1–4 the web 5 is fed via driven rollers 7A–7C through a register mark detection station 7. The detection station 7 includes a light source 8 which illuminates that section 9 of the web within the detection station 7. Light reflected from a side portion of the web 5 passes to a detector head 10. As will be explained below, the detector head 10 includes logic circuitry 40 which generates two signals P, Q which are passed along respective lines 11, 12 to the controller 6.

Figure 2:
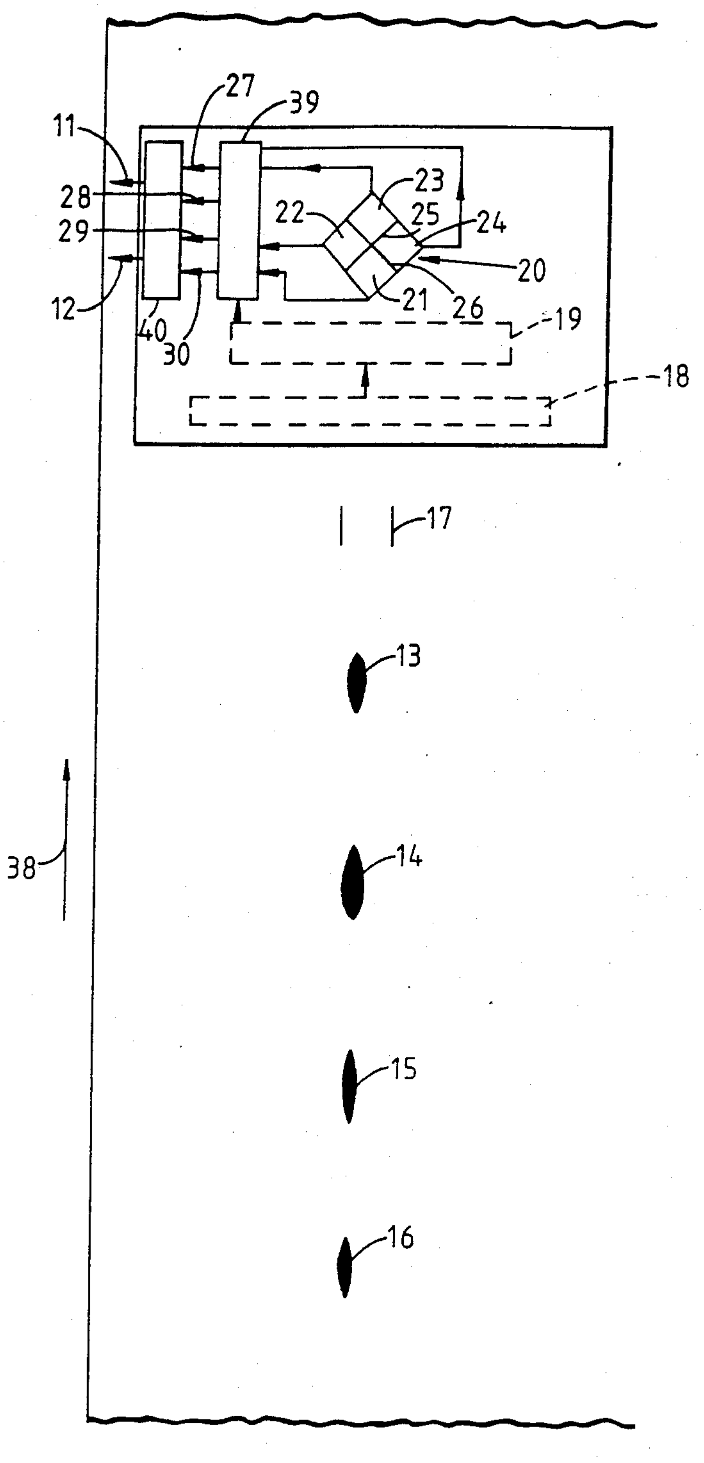
FIG. 2 is a schematic plan of part of the detection station shown in FIG. 1; and, FIG. 3 is a circuit diagram of the logic circuitry and the quadrant array contained in the detector head of the detection station shown in FIG. 2.

In a track alongside the image printed on the web, each printing unit 1–4 prints a register mark 13–16 (FIG. 2). In normal operation, these register marks 13–16 will be spaced apart from one another by a predetermined distance (normally the same distance between each pair of marks) and their lateral positions relative to the feed system will also be substantially the same. For reasons to be explained below, the leading printing unit 1 also prints a code mark 17 upstream of the register marks 13–16.

The detector head 10 includes a linear charged coupled device (CCD) array 18 at its upstream end coupled via a microprocessor 19 with a quadrant array 20. The quadrant array has a conventional form and comprises four photodetectors 21–24 positioned within respective quadrants which define two orthogonal axes 25, 26. As can be seen in FIG. 2, the axes 25, 26 are inclined transverse to the direction of web travel indicated by an arrow 38. Each of the photodetectors 21–24 is connected via a switch 39 controlled by the microprocessor 19 to respective conductors 27–30 shown in more detail in FIG. 3.

The photodetectors 21–24 generate signals, labelled A, B, C, D respectively. The conductors 27–30 are connected to logic circuitry 40 (FIG. 3) comprising four adder circuits 31–34 and two subtraction circuits 35, 36. The output signals from the subtraction circuits 35, 36 are fed to the conductors 11, 12 respectively. The signal A is fed to adder circuits 31, 33; the signal B is fed to the adder circuits 31, 34; the signal C is fed to the adder circuits 32, 34; and the signal D is fed to the adder circuits 32, 33. The output signals from the adder circuits 31, 32 representing A+B and C+D respectively are fed to the subtraction circuit 35 while the output signals from adder circuits 33, 34 representing A+D and B+C respectively are fed to the subtraction circuit 36.

In operation, the microprocessor 19 monitors the output signals from the CCD array 18 onto which light reflected from the section of the web 9 in the detection station 7 impinges. Initially, the switch 39 is open so that no signals are passed to the logic circuitry 40 which will thus not respond to erroneous marks appearing on the web. As soon as the code mark 17 is detected by the CCD array 18, the microprocessor 19 responds to this detection by closing the switch 39. At this stage, each photodetector 21–24 in the quadrant array should receive substantially the same intensity of light and thus the signals A–D will be the same. Thus, the output signals P, Q will both be zero. When the first register mark 13 reaches the detector station 7, an image of that mark will be reflected onto the quadrant array 20. The image will traverse the array 20 as the web moves and thus the intensity of light received by each of the photodetectors 21–24 will vary during that movement.

Figure 3:
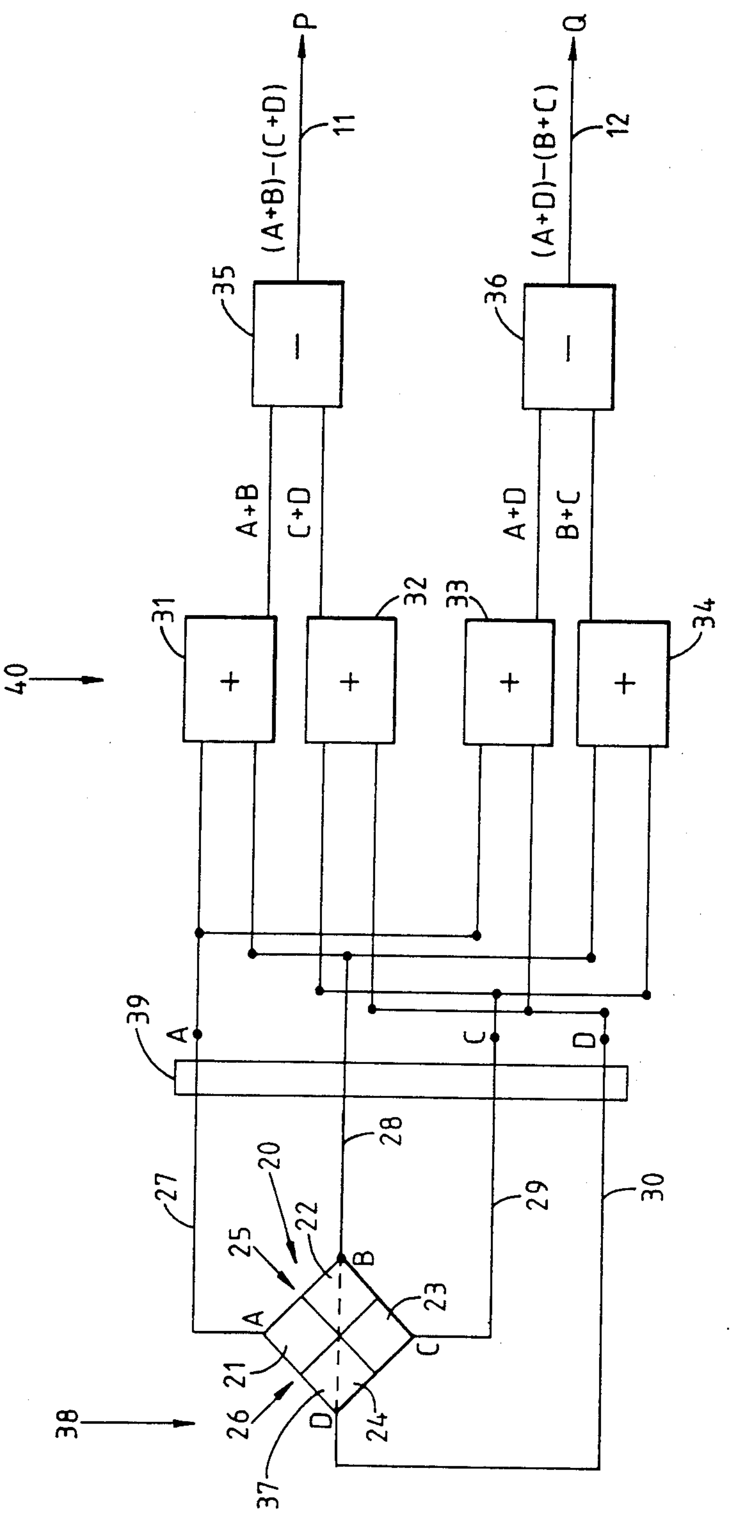

As will be seen from FIG. 3, the output signal P is representative of the effect of the image of the register mark on photodetectors 21, 22 as compared with the image on photodetectors 23, 24. Thus, this signal P will start from a null value, rise to a first peak, pass through a null position and rise to a second peak (or trough) and then return to the null position. The intermediate null position will occur when the mark is centred about the axis 26 indicating the time at which equal areas of the mark are positioned on either side of the axis 26. Similarly, the signal Q will pass through an intermediate null position when the mark is centred about the axis 25.

The controller 6 monitors the output signal P, Q and measures the times $t_1$, $t_2$ at which the signals P, Q respectively pass through intermediate null values. From these times $t_1$, $t_2$, a time $t_3$ can be calculated corresponding to a time at which the register mark crosses an imaginary line 37 orthogonal to the web direction 38. This time $t_3$ is given by the equation:

$$t_3=(t_1+t_2)/2$$

This calculation is repeated by the controller 6 for each of the register marks 13–16 and the difference between the times $t_3$ is calculated. These differences should, if registration is correct, be the same and if there are any variations in these differences, these variations can than be used in a conventional manner to determine the corrections needed to minimise the variations by subsequent web speed control.

It is also necessary to monitor the sidelay (s) of the web—that is the lateral offset of the web from some predetermined position. The sidelay is measured by determining the difference between the times for the register mark to cross the axes 25, 26 i.e. $t_1-t_2$. After compensation for the speed of the web, this difference between the times $t_1$, $t_2$ provides an indication of the degree of side lay. That is:

$$s=k(t_1-t_2)v$$

where k is a constant and v is the velocity of the web.

For example, if the mark passes exactly through the middle of the quadrant array 20, $t_1=t_2$ and $s=0$. The greater the sidelay towards quadrant 24, for example, then the smaller s and the greater the sidelay towards quadrant 22, the larger s.

Once again, the controller 6 responds to the value s to adjust the feed associated with the appropriate printing unit 1–4 so as to correct for the lateral offset in a subsequent print run.

It should be noted that in order to obtain the web speed, one of the printing units 1–4 can lay down two register marks a predetermined distance apart, the controller 6 responding to the times $t_3$ calculated for each of these marks in the way specified above to determine from the difference between those times and the distance between the marks the speed of the web.

I claim:

1. A method of monitoring the passage of a mark on a portion of a web (5), the method comprising causing a web to move through a detection station (7) and illuminating at least said portion of the web carrying said mark; causing an image of said mark to be projected onto a symmetrical array (20) of detector elements (21–24) at said detection station, said detector elements defining at least two axes (25, 26) between them transverse to the direction of movement of said web; determining the times ($t_1$, $t_2$) at which substantially equal areas of said mark are projected on either side of said axes; and determining a time ($t_3$), at which said mark crosses a first line (37) orthogonal to the direction of movement (38) of said web, wherein $t_3=(t_1+t_2)/2$.

2. A method according to claim 1, wherein said array of detector elements comprises a quadrant array.

3. A method according to claim 1, further comprising determining the difference between the times $t_1$, $t_2$ to generate a lateral offset factor.

4. A method according to claim 3, wherein said lateral offset factor (S) is defined as:

$$S=k(t_1-t_2)\ V$$

where k is a constant and V is the velocity of said web.

5. A method according to claim 1, wherein said detector elements are also arranged symmetrically about a second line orthogonal to said first line.

6. A method of monitoring the registration of a web (5) carrying a number of register marks (13–16) normally spaced apart in the direction of the web movement by a predetermined amount, the method comprising for each said mark causing said web to move through a detection station (7) and illuminating at least said portion of the web carrying said mark; causing an image of said mark to be projected onto a symmetrical array (20) of detector elements (21–24) at said detection station, said detector elements defining at least two axes (25, 26) between them transverse to the direction of movement of said web; wherein said detector elements of said array are arranged symmetrically about a first line (37) orthogonal to said web direction, the method further comprising determining the times ($t_1$, $t_2$) at which substantially equal areas of said mark are projected on either side of said axes, and determining a time ($t_3$) representative of when said mark crosses said first line, wherein $t_3=(t_1+t_2)/2$.

7. A method according to claim 6, wherein said detector elements are also arranged symmetrically about a second line orthogonal to said first line.

8. A method of monitoring the registration of a web carrying at least one register mark, the method comprising causing a web (5) to move through a detection station (7) and illuminating at least said portion of the web carrying said mark; causing an image of said mark to be projected onto a symmetrical array (20) of detector elements (21–24) at said detection station, said detector elements defining at least two axes (25, 26) between them transverse to the direction of movement of said web; determining the times ($t_1$, $t_2$) at which substantially equal areas of said mark are projected on either side of said axes, and determining the difference between the times $t_1$, $t_2$ to generate a lateral offset factor.

9. A method according to claim 8, wherein said lateral offset factor (S) is defined as:

$$S=k(t_1-t_2)V$$

where k is a constant and V is the velocity of said web.

10. A method of web register control comprising printing on a web (5) at least two register marks one behind the other in a track extending in the direction of travel of the web, the marks being separated from one another by a predetermined distance when register is correct, monitoring the passage of a mark through a detection station (7) by causing said web to move through a detection station and illuminating at least said portion of the web carrying said mark; causing an image of said mark to be projected onto a symmetrical array (20) of detector elements (21–24) at said detection station, said detector elements defining at least two axes (25, 26) between them transverse to the direction of movement of said web; determining times ($t_1$, $t_2$) at which substantially equal areas of said mark are projected on either side of said axes; determining a time ($t_3$), at which said mark crosses a first line (37) orthogonal to the direction of movement of said web, wherein $t_3=(t_1+t_2)/2$; and controlling subsequent movement of said web in response to said determined times ($t_3$).

11. A method according to claim 10, wherein said detector elements are also arranged symmetrically about a second line orthogonal to said first line.

12. Apparatus for monitoring the passage of a mark on a portion of a web (5), the apparatus comprising feed means (7A–7C) for feeding said web through a detection station (7); a light source (8) for illuminating said portion of said web carrying said mark at said detection station; a symmetrical array (20) of detector elements (21–24) onto which an image of said mark is projected at said detection station, said detector elements defining at least two axes (25, 26) between them transverse to the direction of movement of said web; and processing means (6) for determining the times $t_1$, $t_2$ at which substantially equal areas of said mark are projected on either side of said axes, and for determining a time ($t_3$), at which said mark crosses a line (37) orthogonal to the direction of movement of said web, wherein $t_3=(t_1+t_2)/2$.

13. Apparatus according to claim 12, wherein said detector elements comprise photodetectors.

14. Apparatus according to claim 12, wherein said array of detector elements comprises a quadrant array.

* * * * *